(12) United States Patent
Anders et al.

(10) Patent No.: US 9,213,778 B2
(45) Date of Patent: Dec. 15, 2015

(54) SOCIAL NETWORK POSTING ANALYSIS USING DEGREE OF SEPARATION CORRELATION

(71) Applicant: International Business Machines Corporation, Armonk, NY (US)

(72) Inventors: Kelley L. Anders, East New Market, MD (US); Trudy L. Hewitt, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

(21) Appl. No.: 13/964,767

(22) Filed: Aug. 12, 2013

(65) Prior Publication Data
US 2015/0046460 A1   Feb. 12, 2015

(51) Int. Cl.
*G06F 17/30* (2006.01)
*G06Q 50/00* (2012.01)

(52) U.S. Cl.
CPC ............ *G06F 17/3089* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,177,880 B2 * | 2/2007 | Ruvolo et al. ........................ | 1/1 |
| 7,707,122 B2 | 4/2010 | Hull et al. | |
| 7,818,392 B1 | 10/2010 | Martino et al. | |
| 8,275,648 B2 | 9/2012 | Carrier et al. | |
| 8,825,759 B1 | 9/2014 | Jackson et al. | |
| 8,843,433 B2 * | 9/2014 | Flinn et al. ........................ | 706/52 |
| 2005/0021750 A1 * | 1/2005 | Abrams ........................ | 709/225 |
| 2008/0301112 A1 | 12/2008 | Wu | |
| 2009/0106080 A1 | 4/2009 | Carrier et al. | |
| 2009/0254499 A1 * | 10/2009 | Deyo ............................ | 706/12 |
| 2009/0271370 A1 | 10/2009 | Jagadish et al. | |
| 2009/0319436 A1 | 12/2009 | Andra et al. | |
| 2011/0004520 A1 | 1/2011 | Chou et al. | |
| 2012/0015746 A1 | 1/2012 | Mooney et al. | |
| 2012/0233260 A1 * | 9/2012 | Tiu et al. ........................ | 709/204 |
| 2012/0290672 A1 | 11/2012 | Robinson et al. | |
| 2012/0291137 A1 | 11/2012 | Walsh et al. | |
| 2013/0031190 A1 | 1/2013 | Chan et al. | |
| 2013/0036109 A1 | 2/2013 | Kulick et al. | |
| 2013/0046770 A1 | 2/2013 | Tseng | |
| 2013/0073631 A1 * | 3/2013 | Patton et al. ................... | 709/204 |

(Continued)

OTHER PUBLICATIONS

Author Unknown, System and Method for Sharing Rights-Enabled Social Media Network Profiles with Telecommunications Devices, Technical Disclosure No. IPCOM000222853D, Oct. 25, 2012, pp. 1-3, IP.com, Published online at: http://ip.com/IPCOM/000222853.

(Continued)

*Primary Examiner* — Hung Le
(74) *Attorney, Agent, or Firm* — Lee Law, PLLC; Christopher B. Lee

(57) ABSTRACT

A degree of social network separation of a social network user that generated expressive content of a social media posting is identified relative to a specified social network user for each of a group of social media postings. Social media postings with an equivalent identified degree of social network separation relative to the specified social network user are grouped. Differences between the expressive content of the grouped social media postings at different degrees of social network separation are determined. The determined differences between the expressive content of the grouped social media postings at the different degrees of social network separation are rendered.

14 Claims, 4 Drawing Sheets

(56) References Cited

U.S. PATENT DOCUMENTS

| | | | |
|---|---|---|---|
| 2014/0114978 A1* | 4/2014 | Chatterjee et al. | 707/739 |
| 2014/0122653 A1* | 5/2014 | Hosseini et al. | 709/219 |
| 2014/0143323 A1* | 5/2014 | Posse et al. | 709/204 |
| 2014/0282096 A1* | 9/2014 | Rubinstein et al. | 715/753 |
| 2014/0337317 A1* | 11/2014 | Woss et al. | 707/722 |
| 2015/0100586 A1* | 4/2015 | Caruso | 707/747 |

OTHER PUBLICATIONS

Nitai B. Silva, et al., A Graph-Based Friend Recommendation System Using Genetic Algorithm, 2010 IEEE Congress on Evolutionary Computation, Jul. 18, 2010, pp. 1-7, IEEE Xplore, Published online at: http://ieeexplore.ieee.org/xpl/login.jsp?tp=&arnumber=5586144&url=http%3A%2F%2Fieeexplore.ieee.org%2Fxpls%2Fabs_all.jsp%3Farnumber%3D5586144.

Haley Degrella, Six Degrees of Separation and Social Media, Journal: Forbes BrandVoice, Nov. 18, 2011, pp. 1-2, Forbes.com, LLC, Published online at: http://www.forbes.com/sites/gyro/2011/11/18/six-degrees-of-separation-and-social-media/.

Nathan Eagle, et al., Reality mining: sensing complex social systems, Article, Nov. 3, 2005, pp. 1-14, Springer-Verlag London Limited, Published online at: http://realitycommons.media.mit.edu/pdfs/realitymining.pdf.

Author Unknown, Qualtrics.com: Sophisticated Research Made Simple, Website/page, Printed from website on Aug. 12, 2013, pp. 1-2, Qualtrics, Published online at: http://www.qualtrics.com/.

United States Patent and Trademark Office, Office Action for U.S. Appl. No. 13/969,099, Apr. 21, 2015, pp. 1-12, Alexandria, VA, USA.

* cited by examiner

ND DESCRIPTION

SOCIAL NETWORK POSTING ANALYSIS USING DEGREE OF SEPARATION CORRELATION

BACKGROUND

The present invention relates to social network posting analysis. More particularly, the present invention relates to social network posting analysis using degree-of-separation correlation.

Social networks allow people (termed "social network contacts" within the social networks) to interact within an online environment. Social networks allow social network contacts to communicate with one another using a common platform. Social network contacts may submit pictures and stories for other social network contacts to view and read.

BRIEF SUMMARY

A method includes identifying, via a processor, relative to a specified social network user for each of a plurality of social media postings, a degree of social network separation of a social network user that generated expressive content of the respective social media posting; grouping social media postings that comprise an equivalent identified degree of social network separation relative to the specified social network user; determining differences between the expressive content of the grouped social media postings at different degrees of social network separation; and rendering the determined differences between the expressive content of the grouped social media postings at the different degrees of social network separation.

A system includes an output device; and a processor programmed to: identify, relative to a specified social network user for each of a plurality of social media postings, a degree of social network separation of a social network user that generated expressive content of the respective social media posting; group social media postings that comprise an equivalent identified degree of social network separation relative to the specified social network user; determine differences between the expressive content of the grouped social media postings at different degrees of social network separation; and render, via the output device, the determined differences between the expressive content of the grouped social media postings at the different degrees of social network separation.

A computer program product includes a computer readable storage medium having computer readable program code embodied therewith, where the computer readable program code when executed on a computer causes the computer to: identify, relative to a specified social network user for each of a plurality of social media postings, a degree of social network separation of a social network user that generated expressive content of the respective social media posting; group social media postings that comprise an equivalent identified degree of social network separation relative to the specified social network user; determine differences between the expressive content of the grouped social media postings at different degrees of social network separation; and render the determined differences between the expressive content of the grouped social media postings at the different degrees of social network separation.

DETAILED DESCRIPTION

Figure 1:
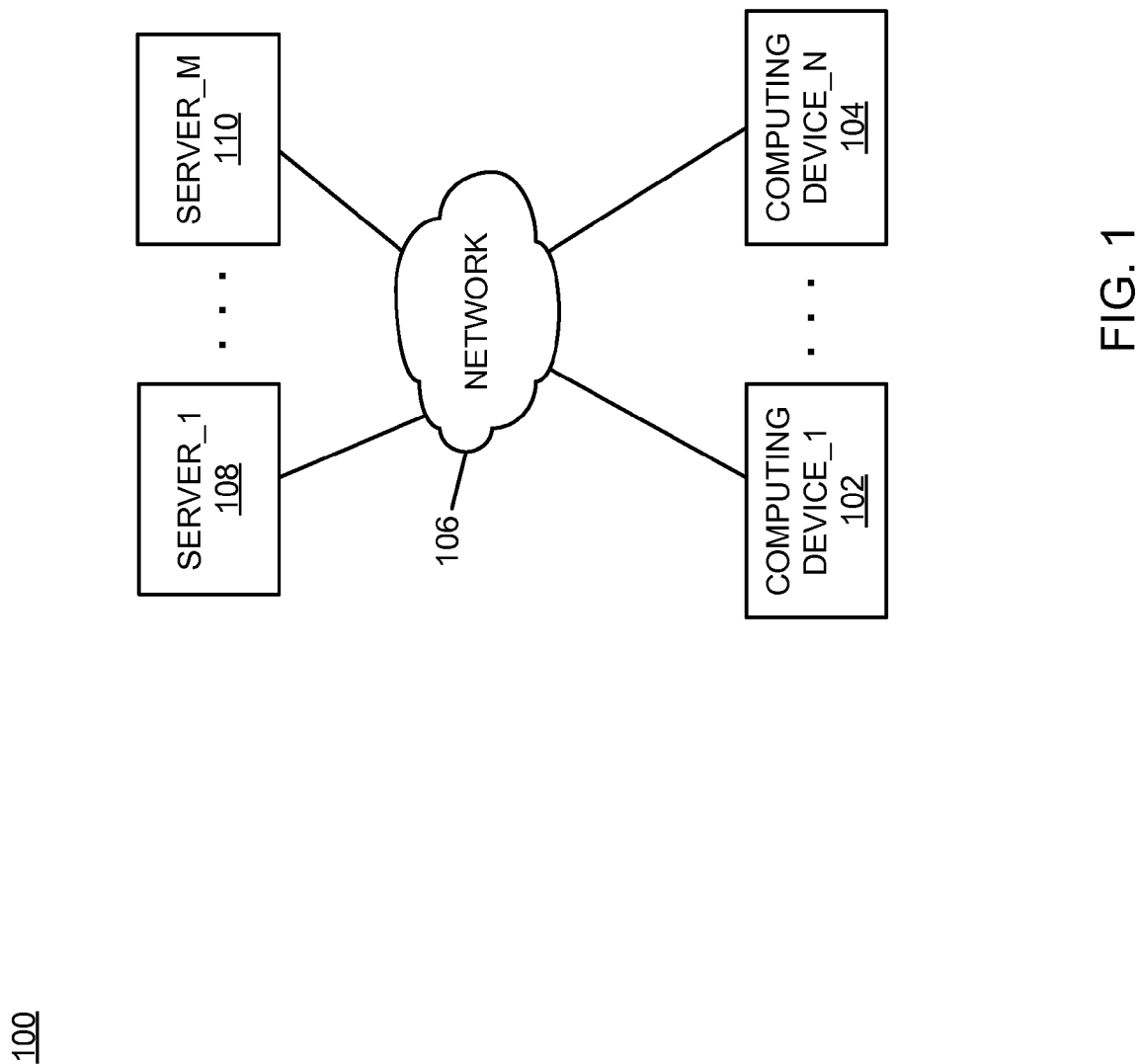
FIG. 1 is a block diagram of an example of an implementation of a system for social network posting analysis using degree-of-separation correlation according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides social network posting analysis using degree-of-separation correlation. The present technology allows a social network user to collect, analyze and correlate expressive content of social network postings (e.g., opinions, information, etc.) of other social network users into correlated groupings based upon a degree of social network separation from the social network user. The correlated groupings of social network postings allow the social network user to evaluate differences between expressed ideas of social network postings of other users within their immediate social network relative to the ideas expressed at different degrees of social network separation from the social network user in one or more social networks. A visual user interface allows the social network user that initiated or that is reviewing the correlated social network postings to graphically interpret different perspectives, opinions, and feedback, at the different degrees of social network separation. Rendered output of the visual user interface may include determined predominant opinions within the respective degrees of social network separation, opinion trends across the different degrees of social network separation, deviations from target configured expressed opinions, degrees of separation at which to focus efforts to improve opinion change within a social network community or across different social network communities, and other information as appropriate for a given implementation.

As such, the visual user interface shows groupings of correlated social network postings, and visually depicts variations and changes of content of the social network postings based on the degree of separation from the initiating or reviewing social network user. The correlated groupings of social network postings may be generated from various social media inputs, such as social media channels, social networks, social network-based communities, network-based topic discussions and forum platforms, and other forms of electronic information sharing channels.

Using the technology described herein, a business and/or user may identify a predominant opinion/perception of users on a topic, within different degrees of social network separation within both their immediate and extended social networks, to analyze and determine whether the content of the social network postings changes based on the degree of separation from their immediate network. As such, the business or user may gather data to determine and identify changes within the content of the social network postings as the degree of social network separation within one or more social networks gets closer or further away.

For purposes of the present description, the phrase "social network distance" and the phrase "degree of social network separation" may be used interchangeably, and may refer to a social network contact distance between two respective social network contacts. As such, a given social network user is presumed to be located/situated at an initial degree of social network separation of zero (0). Where two social network users are connected as friends within a social network, their respective social network distance may be considered one (1), such that their degree of social network separation is one (1). Similarly, where two social network users are not directly connected as friends within the social network, but share at least one friend in common within the social network (e.g., their friend's friends), these social network users may be considered to have a social network distance of two (2), such that their degree of social network separation is two (2). To further the present example, where two social network users are not connected as friends and also do not have any friends in common within the social network, but at least one friend/contact of each social network user has at least one other friend/contact in common within the social network (e.g., friends of your friends' friends), these social network users may be considered to have a social network distance of three (3), such that their degree of social network separation is three (3). The degree-of-separation analysis may continue in this manner for further degrees of separation to identify social network distances and degrees of social network separation between further removed social network users.

To provide an example use-case, it is assumed that a social network user wants to make a decision about purchasing a new product, such as a computing device or a software application. The user may initiate a poll within their social network to ask social network users (social network contacts) for their opinions on the product under consideration. Expertise in this product category may not actually appear within the social network until a third (3rd) or fourth (4th) degree of separation. The present technology will allow the user to dynamically convert and be provided with a visual representation of the perspectives/opinions/feedback and other social network postings from the user's social network based upon the degree of separation between a social network contact with the expertise and the user that generated the initial posting.

As another example use-case, a business may desire to expand its customer base and may make a determination as to whether to invest in a new feature for a product to enhance user experience for existing customers as well as attract new customers. The business may initiate a question or discussion topic on multiple social networks to determine how the particular feature may be received by both its current customers and non-customers. For purposes of the present example, it is assumed that current customers are at a social network degree of separation of one (1). The business may post the question or discussion topic, and may use the present technology to evaluate responses based upon the degree of social network separation of respondents. As such, where the evaluation provided by the present technology identifies that at a distant degree of social network separation (e.g., two (2) or three (3) degrees of social network separation), there is a particularly high number of social network users that are interested in the particular feature and have expressed a positive opinion on the product if the feature is added, the business may determine that adding the feature may improve customer-base growth, and may make a more-informed decision regarding the investment in the new feature for the product.

Similar examples apply to persons running for elected office that desire to improve their perception among voters or entities advocating for certain public or other policies. Further, medical/hospital or pandemic analysis may benefit from use of the present technology. Many other example areas of use of the present technology are possible and all such areas of use are considered within the scope of the present subject matter.

Further, while the present examples utilize social media inputs associated with social networking environments for purposes of illustration, the present technology may be applied to electronic information sharing channels. For example, the present technology may be applied to email communications, text message communications, comment postings to sections of websites, and any other form of electronic communication for which content/opinions may be aggregated and correlated based upon a degree of separation. Accordingly, any such forms of electronic information sharing channels are considered within the scope of the present subject matter.

It should be noted that conception of the present subject matter resulted from recognition of certain limitations associated with social network posting perspective and opinion analysis by businesses. For example, it was observed that using conventional technologies, businesses do not have a way to view data and assemble metrics based upon a degree of social network separation of social media postings by social network users, and that, instead, businesses are required to assume that all perspectives and/or opinions expressed within a social media forum and/or responses to polls have equal weighting. It was determined that social media may be used to identify links between individuals that may otherwise not be visible or apparent to either the individuals or to the businesses. It was further determined that businesses that desire to improve their respective product and/or service offerings, that desire to improve their respective customer-base retention, and that desire to improve their respective customer-base growth may benefit from new technology that evaluates social media postings by social network users (e.g., perspectives and opinions posted online), and that identifies deviations and variations of the social media postings at various degrees of social network separation of the social network users that generate the respective social media postings. The present subject matter improves social media posting analysis by providing for social network posting analysis using degree-of-separation correlation, as described above and in more detail below. As such, improved social media posting analysis may be obtained through use of the present technology.

The social network posting analysis using degree-of-separation correlation described herein may be performed in real time to allow prompt filtering and weighting of social network postings and analysis of changes of perspective/opinion among social network contacts based upon relative social network distances between the social network contacts that make the respective social network postings. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for social network posting analysis using degree-of-separation correlation. A computing device_1 102 through a computing device_N 104 communicate via a network 106 with several other devices. The other devices include a server_1 108 through a server_M 110.

As will be described in more detail below in association with FIG. 2 through FIG. 4, the computing device_1 102 through the computing device_N 104 and the server_1 108 through the server_M 110 may each provide automated social network posting analysis using degree-of-separation correlation. The automated social network posting analysis using degree-of-separation correlation is based upon analysis (e.g., with filtering, weighting, and other forms of data analytics) of social media postings relative to a degree of separation of individual social network users. The automated social network posting analysis using degree-of-separation correlation provides visualization of results for the user to enhance understanding of differences of opinion/perspective of social network users as the degree of separation increases relative to any given social network user. As such, the present technology may be implemented at a user computing device or server device level. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
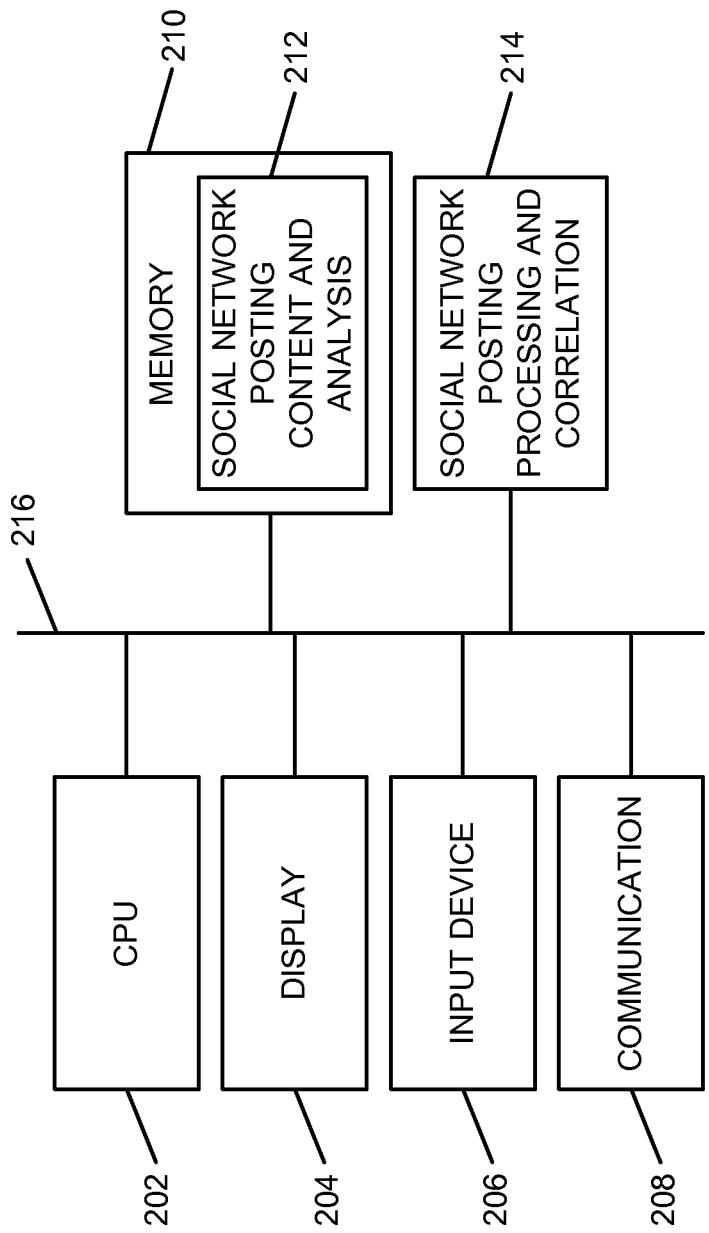
FIG. 2 is a block diagram of an example of an implementation of a core processing module capable of performing social network posting analysis using degree-of-separation correlation according to an embodiment of the present subject matter.

FIG. 2 is a block diagram of an example of an implementation of a core processing module 200 capable of performing social network posting analysis using degree-of-separation correlation. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of social network postings and degrees of separation of associated social network users that have posted expressive content in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a social network posting content and analysis storage and processing area 212 that stores content of social network postings and social network user/contact degrees of separation relative to one another for analysis and correlation by the core processing module 200. As will be described in more detail below, the information stored within the social network posting content and analysis storage and processing area 212 is used to collect, parse, dynamically convert, and correlate expressive content of social network postings (e.g., opinions, information, etc.) of social network users into correlated groupings based upon a degree of social network separation from one or more social network users.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A social network posting processing and correlation module 214 is also illustrated. The social network posting processing and correlation module 214 provides analytical processing capabilities for collecting, parsing, dynamically converting, and correlating expressive content of social network postings of social network users into correlated groupings based upon a degree of social network separation from one or more social network users for the core processing module 200, as described above and in more detail below. The social network posting processing and correlation module 214 implements the automated social network posting analysis using degree-of-separation correlation of the core processing module 200.

It should also be noted that the social network posting processing and correlation module 214 may form a portion of other circuitry described without departure from the scope of the present subject matter. Further, the social network posting processing and correlation module 214 may alternatively be implemented as an application stored within the memory 210. In such an implementation, the social network posting processing and correlation module 214 may include instructions executed by the CPU 202 for performing the functionality described herein. The CPU 202 may execute these instructions to provide the processing capabilities described above and in more detail below for the core processing module 200. The social network posting processing and correlation module 214 may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, and the social network posting processing and correlation module 214 are interconnected via an interconnection 216. The interconnection 216 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
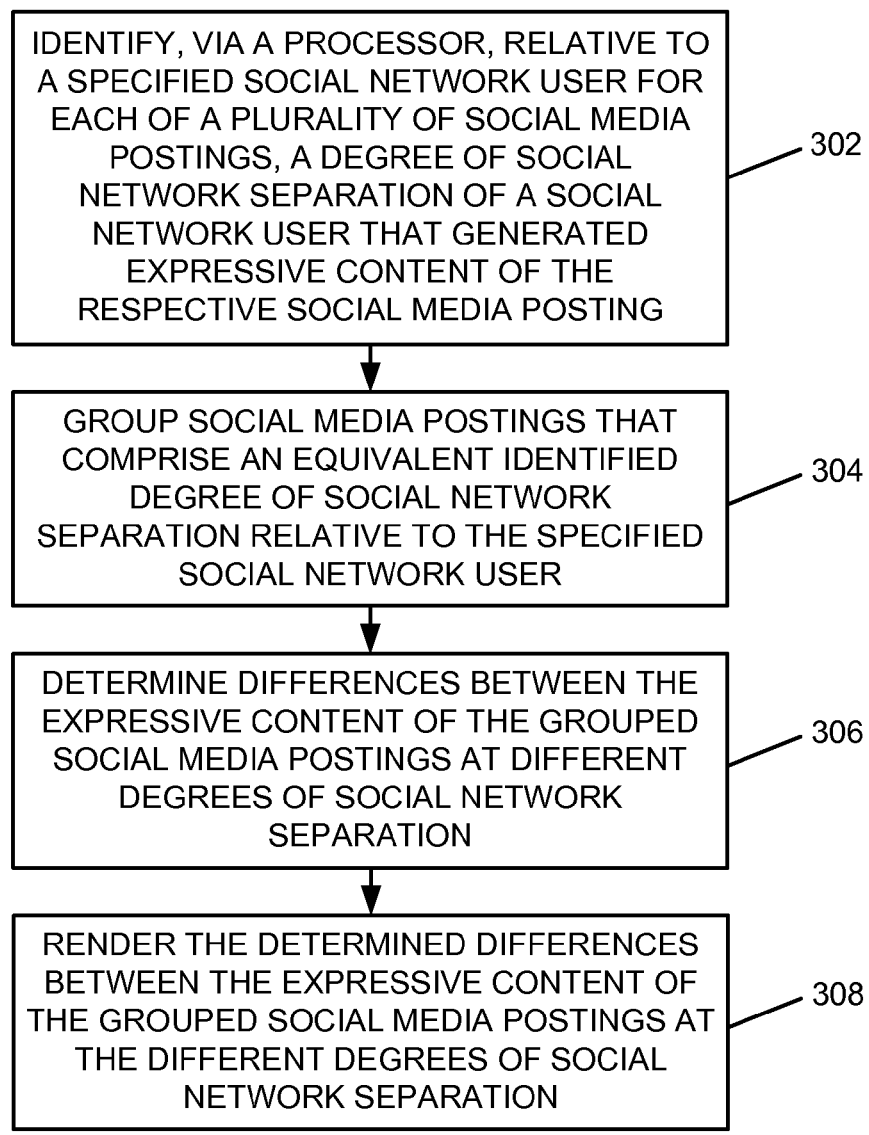
FIG. 3 is a flow chart of an example of an implementation of a process for social network posting analysis using degree-of-separation correlation according to an embodiment of the present subject matter.
Figure 4:
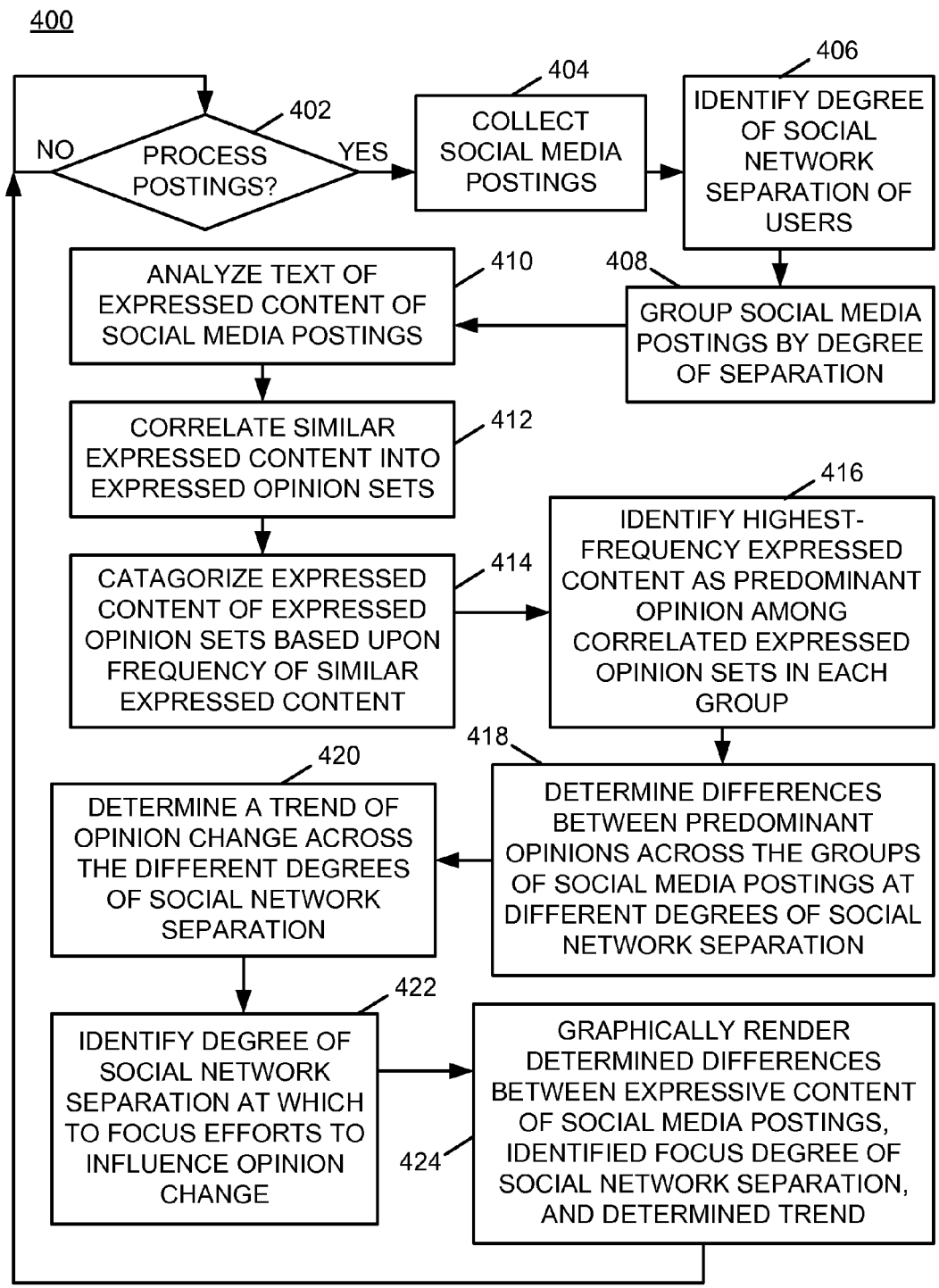
FIG. 4 is a flow chart of an example of an implementation of a process for social network posting analysis using degree-of-separation correlation using correlations of expressed opinions to identify opinion trends and a degree of social network separation at which to focus efforts to influence opinion change according to an embodiment of the present subject matter.

FIG. 3 through FIG. 4 described below represent example processes that may be executed by devices, such as the core processing module 200, to perform the automated social network posting analysis using degree-of-separation correlation associated with the present subject matter. Many other variations on the example processes are possible and all are considered within the scope of the present subject matter. The example processes may be performed by modules, such as the social network posting processing and correlation module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for social network posting analysis using degree-of-separation correlation. At block 302, the process 300 identifies, via a processor, relative to a specified social network user for each of a plurality of social media postings, a degree of social network separation of a social network user that generated expressive content of the respective social media posting. At block 304, the process 300 groups social media postings that comprise an equivalent identified degree of social network separation relative to the specified social network user. At block 306, the process 300 determines differences between the expressive content of the grouped social media postings at different degrees of social network separation. At block 308, the process 300 renders the determined differences between the expressive content of the grouped social media postings at the different degrees of social network separation.

FIG. 4 is a flow chart of an example of an implementation of a process 400 for social network posting analysis using degree-of-separation correlation using correlations of expressed opinions to identify opinion trends and a degree of social network separation at which to focus efforts to influence opinion change. At decision point 402, the process 400 makes a determination as to whether a request to process social media postings has been detected. The request to process social media postings may be detected in response to a user indication via a user interface, and the request may include a designation of a particular specified social network user (e.g., an individual or business entity) relative to which to process the social media postings for degree of social network separation analysis. The request to process social media postings may also include a designation of one or more networks across which to collect and process social media postings.

At block 404, the process 400 collects social media postings for analysis. The social media postings may be collected from one or more social networks as specified by the user for the social media posting processing. At block 406, the process 400 identifies, for each collected social network posting and relative to the specified social network user relative to which to process the social media postings for degree of social network separation analysis, a degree of social network separation of the social network user that generated expressive content of the respective social media posting. As described above, the processing may include identifying the degree of social network separation across multiple social networks of the user that generated the expressive content of each respective social media posting relative to the specified social network user relative to which to process the social media postings for degree of social network separation analysis.

At block 408, the process 400 groups the social media postings that include an equivalent identified degree of social network separation relative to the specified social network user. At block 410, the process 400 analyzes the text of the expressive content of the social media postings within each group of social media postings. For example, the process 400 may parse the social media postings, identify the expressive content of the respective postings, and then evaluate the identified expressive content to determine expressed opinions or positions represented within the expressive content. At block 412, the process 400 correlates, within each group of social media postings, similar expressed opinions of social media postings into expressed opinion sets.

At block 414, the process 400 categorizes the expressive content of the respective expressed opinion sets within each group of social media postings based upon the frequency of similar expressive content. Categorizing the expressive content may include forming the expressed opinion sets and associating a value (e.g., rating, ranking, etc.) with the sets based upon the frequency of similar expressed content to differentiate expressed opinions/content within the different expressed opinion sets. The frequency of similar expressive content may be identified as a number of times a particular opinion or perspective is expressed regarding a topic of social network discussion (e.g., a poll, discussion thread, etc.) relative to other opinions or perspectives regarding the particular topic.

At block 416, the process 400 identifies a highest-frequency (e.g., most often) expressed content (e.g., most frequent opinion) among the various expressed opinion sets within each group of social media postings as a predominant expressed content of the social network users in each group of social media postings. As such, the process 400 may determine differences between the correlated expressed opinion sets within each group of social media postings, and may determine a predominant opinion among the correlated expressed opinion sets within each group of social media postings.

At block 418, the process 400 determines differences between the predominant opinions across the groups of social media postings at the different degrees of social network separation (e.g., "inter-group" differences between the predominant opinions expressed within the groups of social media postings at the different degrees of social network separation). At block 420, the process 400 determines a trend of opinion change across the different degrees of social network separation.

At block 422, the process 400 identifies, among the different degrees of social network separation, a degree of separation at which to focus efforts to influence opinion change. The identification of the degree of social network separation at which to focus efforts to influence opinion change may be based, for example, upon a greatest deviation of opinion within the expressed content relative to a target configured expressed opinion, relative to the determined trend of opinion change, or other factor(s) as appropriate for a given implementation.

At block 424, the process 400 graphically renders the determined differences between the expressive content of the grouped social media postings at the different degrees of social network separation, the identified degree of separation at which to focus efforts to influence opinion change, and the determined trend of opinion change across the different degrees of social network separation. The process 400 returns to decision point 402 and iterates as described above.

As such, the process 400 obtains social media postings from a variety of social networks, and identifies a degree of social network separation from a given user (e.g., social network contact or business) associated with each posting. The process 400 groups the social media postings by the degree of social network separation, analyzes the text content of each social media posting, and correlates within each group similar expressed content into expressed opinion sets. The process 400 categorizes the expressed content within each expressed opinion set based upon a frequency of opinion relative to other opinion sets in each group. The process 400 identifies the highest-frequency content as a predominant opinion among the opinion sets in each group. The process 400 determines differences between predominant opinions across the groups of social media postings at the different degrees of social network separation and determines a trend of opinion change across the different degrees of social network separation. The process 400 further identifies a degree of social network separation at which to focus efforts to influence opinion change. The process 400 graphically renders the determined differences between the expressive content of the grouped social media postings at the different degrees of social network separation, the identified degree of separation at which to focus efforts to influence opinion change, and the determined trend of opinion change across the different degrees of social network separation. Accordingly, the present technology allows a business or other user to analyze large sets of expressed content in the form of opinions, poll responses, or other expressed content, and to determine degrees of separation with effective influence (e.g., users like the product, public office or other campaign, etc.) and areas at which to focus efforts to influence opinion change (e.g., convert users of other products to customers, increase votes for the candidate or issue, etc.).

As described above in association with FIG. 1 through FIG. 4, the example systems and processes provide social network posting analysis using degree-of-separation correlation. Many other variations and additional activities associated with social network posting analysis using degree-of-separation correlation are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
a output device; and
a processor programmed to:
   identify, relative to a specified social network user for each of a plurality of social media postings, a degree of social network separation of a social network user that generated expressive content of the respective social media posting;
   group social media postings that comprise an equivalent identified degree of social network separation relative to the specified social network user;
   determine differences between the expressive content of the grouped social media postings at different degrees of social network separation; and
   render, via the output device, the determined differences between the expressive content of the grouped social media postings at the different degrees of social network separation.

2. The system of claim 1, where, in being programmed to identify, relative to the specified social network user for each of the plurality of social media postings, the degree of social network separation of the social network user that generated the expressive content of the respective social media posting, the processor is programmed to identify the degree of social network separation across multiple social networks.

3. The system of claim 1, where the expressive content of the grouped social media postings comprises expressed opinions within the social media postings related to a topic, and where, in being programmed to determine the differences between the expressive content of the grouped social media postings at the different degrees of social network separation, the processor is programmed to:
   correlate, within each group of social media postings, similar expressed opinions of social media postings into expressed opinion sets; and
   determine differences between the correlated expressed opinion sets within each group of social media postings.

4. The system of claim 3, where, in being programmed to determine the differences between the expressive content of the grouped social media postings at the different degrees of social network separation, the processor is further programmed to:
   determine a predominant opinion among the correlated expressed opinion sets within each group of social media postings; and
   determine differences between the predominant opinions across the groups of social media postings at the different degrees of social network separation.

5. The system of claim 1, where, in being programmed to:
determine the differences between the expressive content of the grouped social media postings at the different degrees of social network separation, the processor is programmed to determine a trend of opinion change across the different degrees of social network separation; and
render, via the output device, the determined differences between the expressive content of the grouped social media postings at the different degrees of social network separation, the processor is programmed to graphically render, via the output device, the determined trend of opinion change across the different degrees of social network separation.

6. The system of claim 1, where, in being programmed to determine the differences between the expressive content of the grouped social media postings at the different degrees of social network separation, the processor is programmed to:
   analyze text of the expressive content of the social media postings within each group of social media postings;
   categorize the expressive content based upon a frequency of similar expressive content within each group of social media postings; and
   identify a highest-frequency expressive content within each group of social media postings as a predominant expressive content of social network users in each group of social media postings.

7. The system of claim 1, where the processor is further programmed to:
   identify, among the different degrees of social network separation, a degree of separation at which to focus efforts to influence opinion change based upon a greatest deviation of opinion within the expressive content relative to a target configured opinion; and
   where, in being programmed to render, via the output device, the determined differences between the expressive content of the grouped social media postings at the different degrees of social network separation, the processor is programmed to graphically render, via the output device, the identified degree of separation at which to focus the efforts to influence opinion change.

8. A computer program product, comprising:
a non-transitory computer readable storage medium having computer readable program code embodied therewith, where the computer readable program code when executed on a computer causes the computer to:
   identify, relative to a specified social network user for each of a plurality of social media postings, a degree of social network separation of a social network user that generated expressive content of the respective social media posting;
   group social media postings that comprise an equivalent identified degree of social network separation relative to the specified social network user;
   determine differences between the expressive content of the grouped social media postings at different degrees of social network separation; and
   render the determined differences between the expressive content of the grouped social media postings at the different degrees of social network separation.

9. The computer program product of claim 8, where, in causing the computer to identify relative to the specified social network user for each of the plurality of social media postings, the degree of social network separation of the social network user that generated the expressive content of the respective social media posting, the computer readable program code when executed on the computer causes the computer to identify the degree of social network separation across multiple social networks.

10. The computer program product of claim 8, where the expressive content of the grouped social media postings comprises expressed opinions within the social media postings related to a topic, and where, in causing the computer to determine the differences between the expressive content of the grouped social media postings at the different degrees of social network separation, the computer readable program code when executed on the computer causes the computer to:

correlate, within each group of social media postings, similar expressed opinions of social media postings into expressed opinion sets; and determine differences between the correlated expressed opinion sets within each group of social media postings.

11. The computer program product of claim 10, where, in causing the computer to determine the differences between the expressive content of the grouped social media postings at the different degrees of social network separation, the computer readable program code when executed on the computer further causes the computer to:

determine a predominant opinion among the correlated expressed opinion sets within each group of social media postings; and determine differences between the predominant opinions across the groups of social media postings at the different degrees of social network separation.

12. The computer program product of claim 8, where, in causing the computer to:

determine the differences between the expressive content of the grouped social media postings at the different degrees of social network separation, the computer readable program code when executed on the computer causes the computer to determine a trend of opinion change across the different degrees of social network separation; and render the determined differences between the expressive content of the grouped social media postings at the different degrees of social network separation, the computer readable program code when executed on the computer causes the computer to graphically render the determined trend of opinion change across the different degrees of social network separation.

13. The computer program product of claim 8, where, in causing the computer to determine the differences between the expressive content of the grouped social media postings at the different degrees of social network separation, the computer readable program code when executed on the computer causes the computer to:

analyze text of the expressive content of the social media postings within each group of social media postings;

categorize the expressive content based upon a frequency of similar expressive content within each group of social media postings; and identify a highest-frequency expressive content within each group of social media postings as a predominant expressive content of social network users in each group of social media postings.

14. The computer program product of claim 8, where the computer readable program code when executed on the computer further causes the computer to:

identify, among the different degrees of social network separation, a degree of separation at which to focus efforts to influence opinion change based upon a greatest deviation of opinion within the expressive content relative to a target configured opinion; and where, in causing the computer to render the determined differences between the expressive content of the grouped social media postings at the different degrees of social network separation, the computer readable program code when executed on the computer causes the computer to graphically render the identified degree of separation at which to focus the efforts to influence opinion change.

* * * * *